United States Patent [19]

Sasaki

[11] Patent Number: 5,721,971
[45] Date of Patent: Feb. 24, 1998

[54] WIRELESS SLAVE ELECTRONIC PHOTOFLASH DEVICE

[75] Inventor: Toyoji Sasaki, Hachioji, Japan

[73] Assignee: Olympus Optical Co., Ltd., Tokyo, Japan

[21] Appl. No.: 584,308

[22] Filed: Jan. 11, 1996

[30] Foreign Application Priority Data

Jan. 10, 1995 [JP] Japan .................. 7-001806

[51] Int. Cl.$^6$ .................. G03B 15/03
[52] U.S. Cl. .................. 396/56; 396/155
[58] Field of Search .................. 354/129, 131, 354/132, 424; 396/155, 56

[56] References Cited

U.S. PATENT DOCUMENTS

| | | | |
|---|---|---|---|
| 4,049,996 | 9/1977 | Vital et al. | 315/151 |
| 4,155,029 | 5/1979 | Yamaoka | 315/151 |
| 4,368,966 | 1/1983 | Hagyuda | 354/33 |
| 4,626,093 | 12/1986 | Matsui et al. | 354/415 |
| 4,771,301 | 9/1988 | Yamada | 354/132 |
| 5,023,639 | 6/1991 | Ushiro et al. | 354/132 |
| 5,153,632 | 10/1992 | Maida et al. | 354/415 |
| 5,159,379 | 10/1992 | Shirane et al. | 354/415 |
| 5,164,759 | 11/1992 | Yasukawa | 354/415 |
| 5,283,610 | 2/1994 | Sasaki | 354/416 |
| 5,384,611 | 1/1995 | Tsuji et al. | 354/131 |

FOREIGN PATENT DOCUMENTS

| | | |
|---|---|---|
| 5-19338 | 1/1993 | Japan . |
| 5-93944 | 4/1993 | Japan . |

*Primary Examiner*—Cassandra C. Spyrou
*Assistant Examiner*—Daniel Chapik
*Attorney, Agent, or Firm*—Louis Weinstein

[57] ABSTRACT

A wireless slave electronic photoflash device is located separately from a camera body, and responsive to light emission of a master electronic flash unit built in or connected to the camera body, for emitting light synchronized therewith. The slave flash device includes a discharge tube, a trigger section responsive to a trigger signal for causing the discharge tube to emit light, a photodetector adapted to detect an optical signal from the master flash device, a one-shot section which is retriggerable and generates and issues a signal during a predetermined time period in response to the receipt of a signal from the photodetector, and a trigger signal output section which generates and issues the trigger signal based on the signal from the one-shot section and the signal from the photodetector.

26 Claims, 4 Drawing Sheets

WIRELESS SLAVE ELECTRONIC PHOTOFLASH DEVICE

BACKGROUND OF THE INVENTION

1. Field of the Invention

The present invention relates generally to electric flash devices for producing flashes of light in synchronism with those of main electric flash units of cameras, and more particularly to wireless "slave" electronic photoflash devices located separately from a camera body without the use of any remote or extension cords for electrical connection therebetween and yet responsive to a master flash device built in the camera body or detachably attached thereto, for producing flashes of light synchronized to main flashes of light for photography from the master flash device at the camera body.

2. Related Art Statement

Conventionally, separate wireless electronic photoflash devices for use with a master flash system to provide synchronous flashes are known, which are referred to as "slave" electronic flash devices hereinafter. Such slave flash devices are located some distance apart from a camera body to produce flashes of light in synchronism with light emission of a master electronic flash unit on the side of the camera body. There is also known a stroboscopic photographing camera system which includes a camera-side master electronic flash unit for sending forth a certain optical signal in advance, and a slave electronic flash device responsive to the optical signal for producing flashes of light synchronized to the main flashes of the master flash unit only upon the receipt of such optical signal. With the prior art camera system, since the slave flash device does not respond to the receipt of any other external flashes without the certain optical signal and can eliminate the occurrence of erroneous light emission, extra power consumption will be kept to a minimum to attain energy saving, while "protecting" camera users or photographers against the loss of desired shutter chances.

A significant problem found in the prior art camera system is that the master electronic photoflash unit, which may be either a built-in component or a removable (handle- or shoe-mount) one, should be so designed as to have a means capable of developing an optical signal indicative of specific kind of instruction, thus causing the camera body and its associated optical-signal sensitive slave electronic flash device to increase in manufacturing cost as a whole. To avoid such problem, several techniques have been proposed previously, one of which is disclosed, for example, in Published Unexamined Japanese Patent Application Number 5-19338. This prior art is arranged by taking into account the fact that the presently available cameras can offer an advanced function of what is called the "preliminary flashes for red-eye reduction" using interrupted continuous light emission: before the actual exposure, the electronic flash unit emits a quick series of weak preflashes to "stop-down" the subjects' eyes and thus suppress or eliminate the occurrence of undesired "red-eye phenomenon" (sometimes also known as "pink-eye effect" in the art). More specifically, in the case where photographing is carried out by the use of such red-eye reduction preflashes on the side of a camera, the slave electronic flash device is controlled such that it measures the actual time intervals of the preflashes of light and, when the measured intervals are detected to meet a predetermined timing condition, produces a flash of light in synchronism with the main flash of the master flash unit on the camera side.

With the prior art, as far as the camera which comes with the "red-eye reduction preflash" capability, it is unnecessary that any special functions are added to the master flash unit, with the result of manufacturing cost being lowered reasonably. In addition, since the slave flash device will produce no flashes of light in the absence of such red-eye reduction preflashes detected, the occurrence of any erroneous light emission can be minimized thus enabling extra power consumption to decrease while preventing photographers from losing their desired shutter chances.

Unfortunately, however, the prior art camera system suffers from a problem in that the slave electronic flash device should additionally require a special controller arrangement for measuring a certain timing and for decoding the intended instruction carried by an optical signal from the main electronic flash unit. This means that, while the camera is kept at lower cost, the resulting cost of such slave flash device may be increased.

OBJECTS AND SUMMARY OF THE INVENTION

It is an object of the invention to provide a low-cost wireless slave electric flash device capable of detecting preliminary flashes of light (interrupted continuous light) for red-eye reduction from a master electric flash device on the side of a camera body and of producing flashes of light synchronized to main flashes of the master flash device.

It is another object of the invention to provide a low-cost, energy-saving wireless slave electronic photoflash device which does not emit light in response to preliminary flashes of light from a master electronic flash device and which can flash in synchronism only with the main flash thereof.

It is a further object of the invention to provide a wireless slave electronic photoflash device which can remain insensitive to any one-shot or single flash having no certain instruction signals and can minimize the occurrence of extra energy consumption and the loss of shutter chances.

A wireless slave electric flash device in accordance with the instant invention is located separately from a camera body, and is responsive to light emission of a master electric flash device built in or attached to the camera body for emitting light synchronized with a main flash of the master flash device. The slave flash device includes a discharge tube, and a trigger section responsive to a trigger signal for causing the discharge tube to emit light. A photodetector is adapted to detect an optical signal from the master flash device. A one-shot section is provided which is retriggerable and outputs a signal for a predetermined time period in response to the receipt of a signal from the photodetector. A trigger signal output section is also provided which outputs the trigger signal based on the signal from the one-shot section and the signal from the photodetector.

These and other objects, features and advantages of the present invention will become further apparent from the following detailed explanation.

DETAILED DESCRIPTION OF THE PREFERRED EMBODIMENT

Figure 1:
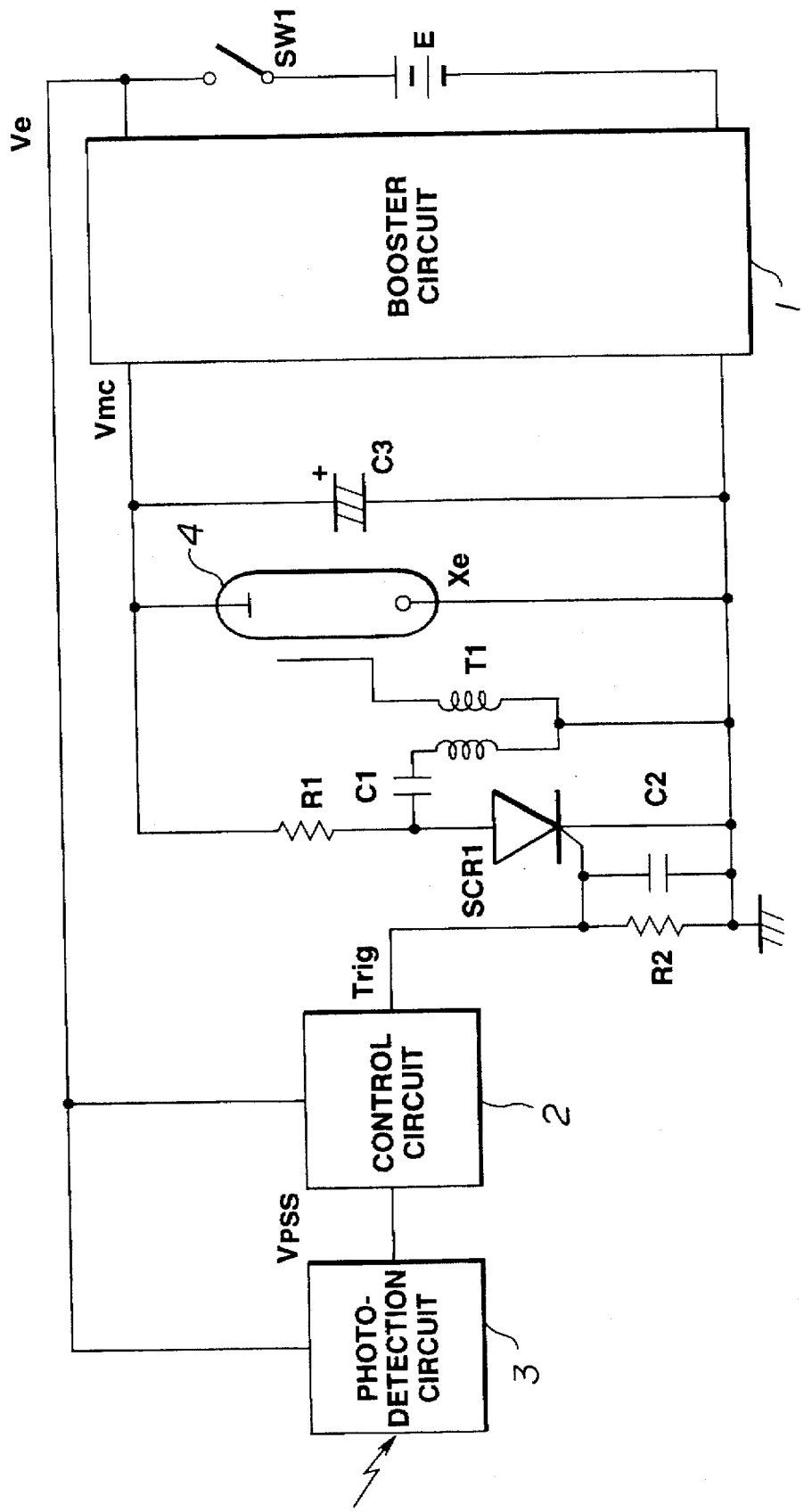
FIG. 1 is a diagram showing the overall circuit configuration of a wireless slave electronic photoflash device in accordance with one preferred embodiment of the invention.

Referring to FIG. 1, a separate wireless "slave" electronic photoflash device in accordance with one preferred embodiment of the invention includes a booster circuit 1, a control circuit 2, and a photodetection circuit 3. The booster circuit 1 is connected to a series circuit of a battery E serving as a direct current (DC) power supply of the device and a switch SW1 acting as a power supply switch. When this switch SW1 is manually operated by camera users or photographers to turn on, the electronic flash device is rendered operative. The booster circuit 1 is for converting a DC power supply voltage Ve of the battery E to a boosted voltage Vmc of higher potential sufficient to enable the device to produce flashes of light. The booster circuit 1 is connected with a parallel circuit of a xenon discharge tube 4 and a main capacitor C3. The booster circuit 1 produces at its output the higher potential boosted voltage Vmc, which is applied to the main capacitor C3 to charge up the same. The xenon discharge tube 4 acts as a stroboscopic flash lamp, and is connected with a trigger circuit of known circuit configuration for activating the xenon lamp 4 at the beginning of a light flush operation thereof, which trigger circuit includes resistors R1, R2, capacitors C1, C2, a trigger transformer T1, and a thyristor SCR1, which are connected as shown in FIG. 1. The photodetection circuit 3 is responsive to the receipt of an optical signal to be transmitted from a master electronic flash unit (not shown in FIG. 1), for developing a corresponding electrical output pulse signal Vpss. This signal Vpss is supplied to the control circuit 2, which then generates and issues a trigger signal Trig to be sent to the trigger circuit.

Figure 2:
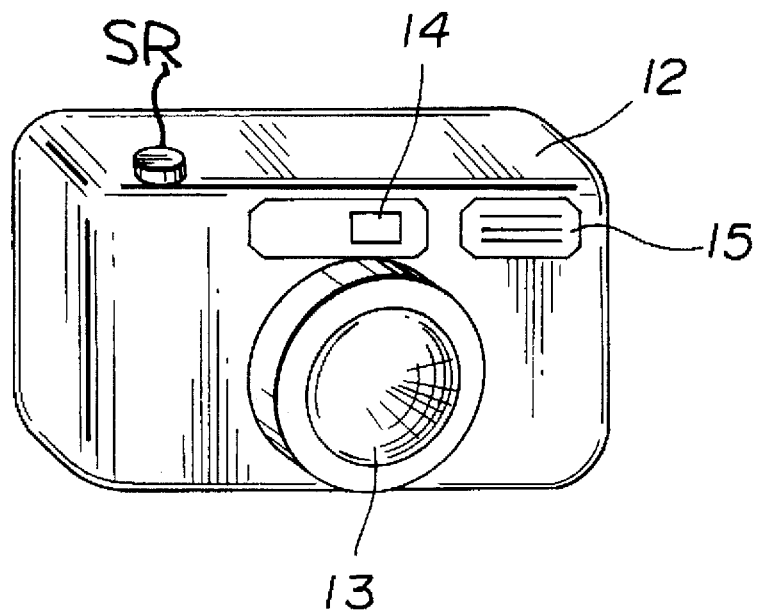
FIG. 2 illustrates a perspective view of a combination of a still camera body with a built-in main flash unit and the slave flash device of FIG. 1 which is located at a distance from the camera body to provide the best possible lighting condition for a desired type of photography.
Figure 2:
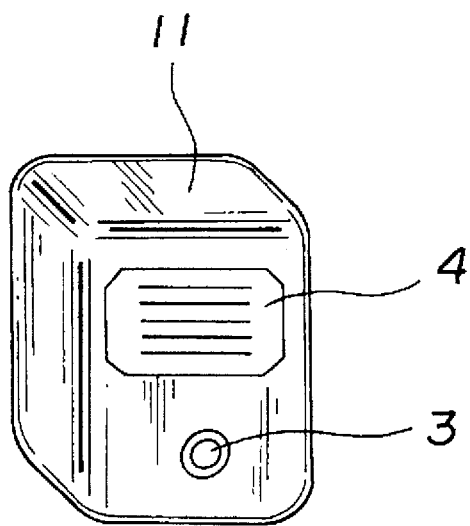

As shown in FIG. 2, the wireless electronic photoflash device designated by numeral 11 is used in combination with a still camera body 12 with its own built-in electronic flash unit 15. The camera body 12 has at its front panel a lens 13, a viewfinder window 14 and a shutter release SR in a known manner. The slave electronic flash device 11 is packed in a housing having a front face in which the xenon flash lamp 4 of FIG. 1 and a photosensor PS1 are embedded. Note that the built-in electronic flash unit 15 may act as a "master" flash device. Note also that the slave electronic flash device 11 is optically coupled to the master flash unit 15 without the use of any extension cords for electrical connection therebetween. When photographing is performed, the slave flash device 11 is located at a selected shooting position spaced apart from the camera body 12 in such a manner that the position of device 11 is suitably determined so as to provide the best possible photography lighting condition for an object to be photographed. While only one device is employed in this example illustrated, a plurality of slave electronic flash devices may alternatively be used together as necessary.

Figure 3:
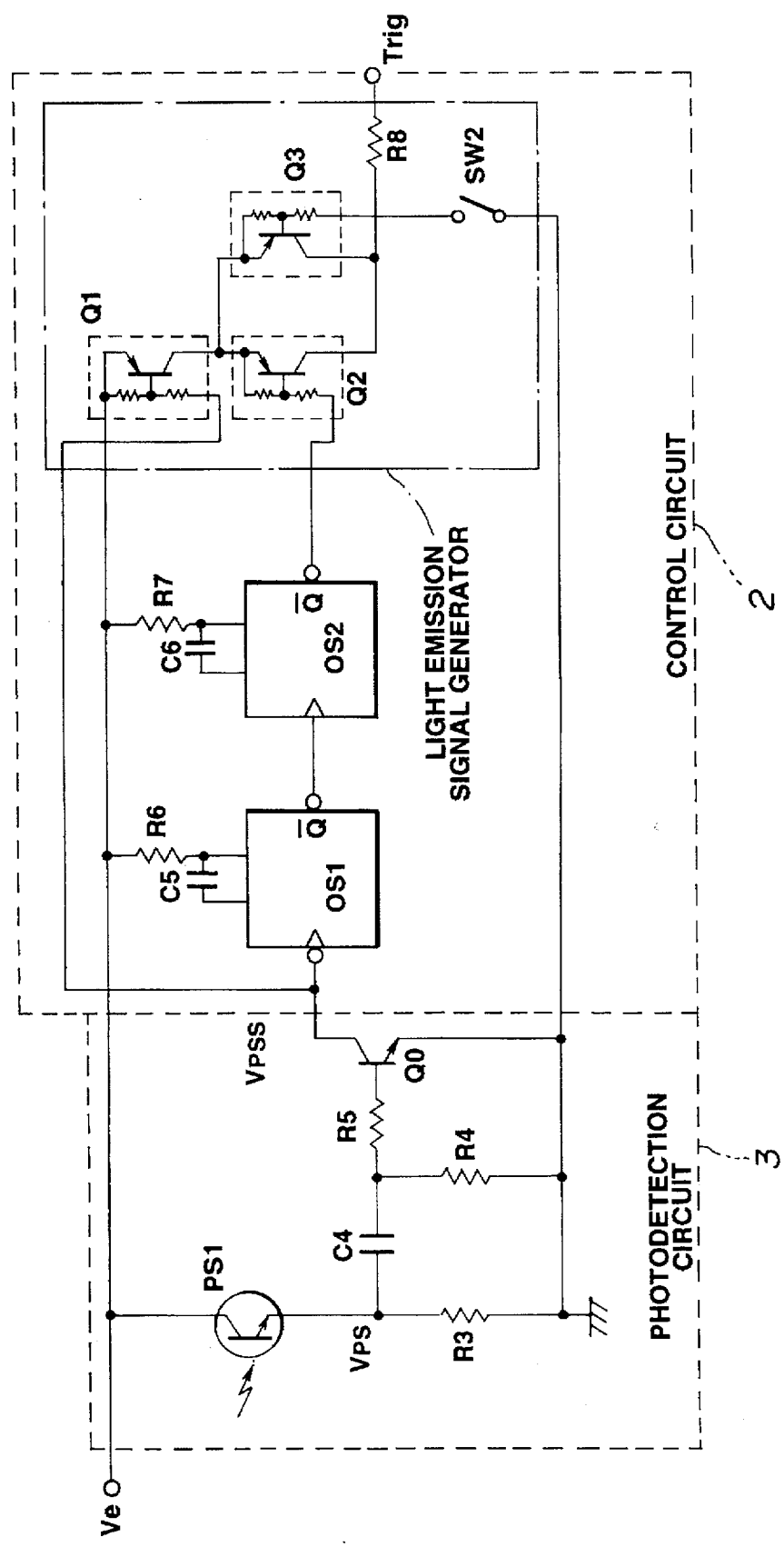
FIG. 3 is a circuit diagram of a photodetection circuit and a control circuit of the slave electronic photoflash device of FIG. 1.

An exemplary internal configuration of the photodetection circuit 3 and control circuit 2 is illustrated in FIG. 3. The photodetection circuit 3 includes a photo-transistor as the photosensor PS1 of FIG. 2, which receives an optical signal sent from the master electronic flash unit 15 built in the camera body 12 and generates and issues a corresponding output voltage signal Vps indicative of the amount of such incident light. The phototransistor PS1 has a collector coupled to the power supply voltage Ve and an emitter connected to the ground potential through a resistor R3. The output voltage Vps appears at a common node of the emitter of phototransistor PS1 and resistor R3, which node is connected to the base of an emitter-grounded transistor Q0 byway of a filter circuit consisting of a capacitor C4 and two resistors R4, R5. The collector of this transistor Q0 functions as an output of the photodetection circuit 3, which is in turn connected to an input of the control circuit 2. The output voltage Vps of the phototransistor PS1 is applied via the filter circuit to the base of transistor Q0, which then generates and issues a pulse signal Vpss that may vary potentially in response to the detected amount (or intensity) of optical signal incident on the phototransistor PS1.

As shown in FIG. 3, the control circuit 2 includes a pair of first and second one-shot monostable multivibrator circuits OS1, OS2. The first one-shot multivibrator OS1 is a retriggerable one, which has a negative-logic trigger input, to which the output pulse signal Vpss of the photo-detection circuit 3 is applied. Note that the signal Vpss is an active-low signal, which is held at a low level equivalent in potential to the power supply voltage Ve in the absence of any input optical signals arrived at the phototransistor PS1.

The first multivibrator OS1 also has a negative-logic output $\overline{Q}$, which is connected to a positive-logic input of the second one-shot multivibrator OS2 for triggering this multivibrator OS2 at a timing synchronized with the rising edge of the output pulse of the first multivibrator OS1. The first multivibrator OS1 is provided with a time constant setter consisting of a resistor R6 and a capacitor C5. Similarly, the second multivibrator OS2 is provided with a time constant setter consisting of a resistor R7 and a capacitor C6. The resistors R6, R7 are coupled to the power supply voltage Ve. Each time constant setter is for determining the pulse width of a corresponding one of the multivibrators OS1, OS2 associated therewith.

The second multivibrator OS2 has a negative-logic output $\overline{Q}$ connected to a light emission signal generator circuit, which includes three transistors Q1, Q2, Q3. The light emission signal generator is provided for generating and issuing a light emission signal Trig, which is used to cause the xenon flash lamp 4 to produce an auxiliary flash of light in synchronism with the main flash of the master electronic flash unit 15 of the camera body 12 of FIG. 2. The transistor Q1 has a base coupled to the voltage signal Vpss, an emitter connected to the power supply voltage Ve, and a collector. The remaining transistors Q2, Q3 are connected in parallel with each other with their emitters and collectors being respectively coupled together at common circuit nodes. The transistor Q2 has a base connected to the output $\overline{Q}$ of the second multivibrator OS1, whereas the transistor Q3 has a base connected through a selector switch SW2 to the ground potential. The emitter-coupled node is connected to the collector of Q1 and the collector-coupled node is connected via a resistor R8 to an output of the control circuit 2.

With such an arrangement, when the series-connected transistors Q1, Q2 turn on simultaneously, the transistor Q2 develops at its collector an output voltage as the light emission signal Trig shown in FIG. 1. When the selector switch SW2 of FIG. 3 is manually operated by photographers to turn on, the base of the transistor Q3 is then coupled to ground causing the control circuit 2 to be bypassed. This may result in the light emission signal Trig being derived from the collector of transistor Q3 in response only to the output signal Vpss of the photodetection circuit 3.

Figure 4:
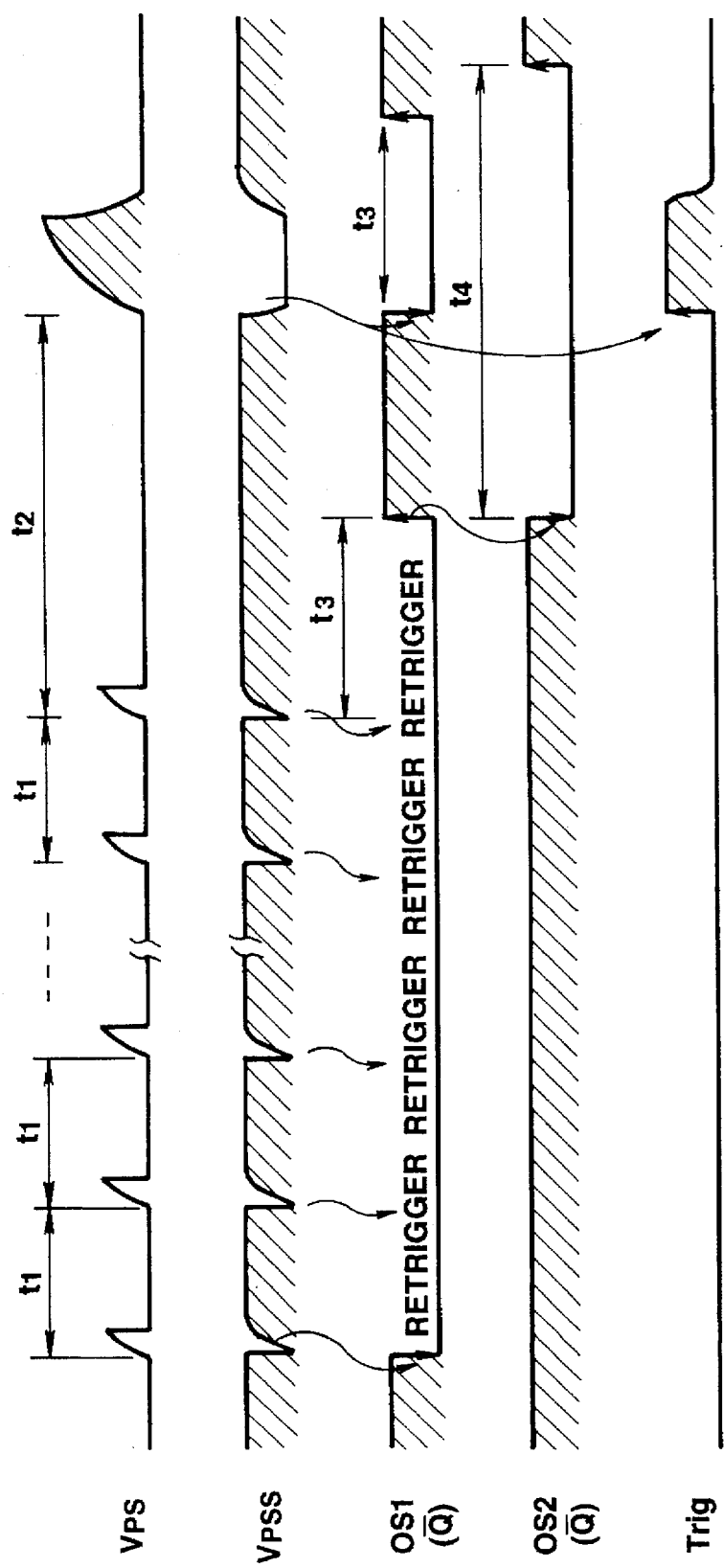
FIG. 4 is an illustration of a timing diagram showing the pulse sequence for the operation of the control circuit of the slave electronic photoflash device shown in FIG. 2.

There are illustrated in FIG. 4 the waveforms of some of the major signals appearing in and around the control circuit 2 when the master electronic flash unit 15 of the camera 12 produces a quick series of weak preflashes of light for red-eye reduction under the condition that the selection switch SW2 of the slave electronic flash device 11 is rendered nonconductive (turned off). The photodetection signal Vps may be obtained by photoelectric conversion of an optical signal from the master flash unit 15, using the combination of the photosensor element PS1 and the resistor R3 of FIG. 3. The photoconverted signal is then filtered, inversion-amplified and wave-shaped to produce the output signal Vpss for operating the control circuit 2. As shown in FIG. 4, this signal Vpss contains a series of pulses (pulse train) of negative polarity, which are synchronized to the red-eye reduction preflashes from the master flash unit 15. Each pulse of signal Vpss acts as a trigger signal for the upstream retriggerable multivibrator OS1 in the control circuit 2, and may also serve to cause the transistor Q1 to turn on.

In the timing diagram of FIG. 4, "t1" represents the time intervals of the red-eye reduction preflashes at the master electronic flash unit 15. After the completion of such red-eye reduction preflashes, a certain "intermission" time interval is present before the initiation of a main flash for photography, which interval is shown by a time period "t2" in FIG. 4. The set value of output pulse width of the first one-shot multivibrator OS1 is designated by "t3," whereas that of the second multivibrator OS2 is "t4." Note that the time periods t1–t4 are specifically determined to meet the following condition: t1<t3<t2<t4.

While the master electronic flash unit 15 is in the process of giving off red-eye reduction preflashes of light, retriggering of the first multivibrator OS1 is repeated as shown in FIG. 4 due to the relation of t1<t3, causing the output pulse width thereof to be expanded beyond its initial set value t3. This means that any rising edges are no longer present in the output pulse signal of the first multivibrator OS1; therefore, the second multivibrator is not triggered under such a condition.

During the "intermission" period t2 after the completion of the red-eye reduction preflashes at the master electronic flash unit 15 and just before the start of a main flash for photography, the first multivibrator OS1 is no longer retriggered due to the relation of t3<t2, and its output logic signal is thus kept at the low level of negative polarity. The output logic signal of this multivibrator OS1 goes high (rises to positive polarity) at a specific time point that comes after the initial set-value period t3 has elapsed from the falling edge of the last one of the red-eye reduction preflashes of light. In response to the receipt of such rising edge, the second multivibrator OS2 is then triggered so that its output logic signal drops down to the low level causing the transistor Q2 series-connected thereto to turn on. When a main flash for photography goes off after the intermission period t2 has elapsed due to the relation of t3<t2<t4, since transistors Q1, Q2 are both forced to turn on simultaneously in synchronism with the main flash of the master electronic flash unit 15, the aforementioned light emission signal Trig is then developed causing the slave electronic flash device 11 to start emission of a synchronous flash light.

The slave electronic photoflash device 11 embodying the invention may be used by a camera user as follows. Assume that, when the camera 12 is put in a normal "single flash" mode rather than in a "red-eye reduction preflash" mode for providing preliminary flashes of light for red-eye reduction, the selection switch SW2 on the slave flash device 11 is manually operated by the user to the on position (i.e. SW2 is closed). Under such a condition, when the master electronic flash unit 15 produces a main flash of light for the actual exposure, the slave flash device 11 also emits an auxiliary flash of light for providing the user's intended lighting condition while maintaining synchronism with the main flash.

Alternatively, when the camera 12 is set in a red-eye reduction preflash mode, the selection switch SW2 of the slave electronic photoflash device 11 is manually turned off (i.e. SW2 is opened) by the user. Once the switch SW2 is rendered nonconductive, the slave flash device 11 will no longer produce any flashes of light erroneously even upon the arrival of an ordinary one-shot or single light flashes.

With the present invention, it is possible by manual operations of the selection switch SW2 to cause the slave electronic photoflash device 11 to be (i) insensitive to the occurrence of red-eye reduction preflashes at the master electronic flash unit 15, and (ii) responsive only to the emission of a main flash light of the master flash unit 15. This enables the camera system to be simplified in overall circuit configuration, which may exclude the need to employ any high-cost central processing unit (CPU) or microcomputer in the slave flash device 11, thus providing a camera system of decreased manufacturing cost. Further, since the slave flash device 11 will be held insensitive to the occurrence of any single-light flashes once after the selection switch SW2 is turned off, any erroneous emission of light can be successfully suppressed or eliminated, thus enabling both the loss of extra energy and the failure of shutter chance to be prevented from taking place.

In this invention, it is apparent that working modes different in a wide range can be formed on the basis of this invention without departing from the spirit and scope of the invention. This invention is not restricted by any specific embodiment except as may be limited by the appended claims.

What is claimed is:

1. A wireless slave electric flash device located separately from a camera body for operation responsive to light emission of a master electric flash unit built in or connected to the camera body and for emitting light synchronized therewith, said slave flash device comprising:

a discharge tube;

trigger means responsive to a trigger signal for causing said discharge tube to emit light;

photodetector means for detecting an optical signal from the master flash unit;

retriggerable one-shot means for outputting a signal for a predetermined time period in response to receipt of a signal from said photodetector means; and trigger signal output means for outputting a trigger signal based on the signal from said one-shot means and the signal from said photodetector means.

2. A wireless slave electric flash device located some distance apart from a camera body and responsive to light emission of a master electric flash unit built in or attached to the camera body and for emitting light synchronized therewith, said slave flash device comprising:

a discharge tube;

trigger means responsive to a trigger signal for causing said discharge tube to emit light;

photodetector means for detecting an optical signal from the master flash unit;

first retriggerable one-shot means for outputting a signal during a first predetermined time period in response to receipt of a signal from said photodetector means;

second one-shot means responsive to an output of said first one-shot means for outputting a signal during a second predetermined time period; and trigger signal output means for outputting a trigger signal when said second one-shot means outputs a signal and when the signal from said photodetector means is present.

3. The device according to claim 2, wherein said trigger signal output means includes:

switch means for selectively providing one of a first and a second signal transmission path, the first path causing an output of said photodetector means to be sent forth directly as a trigger signal irrespective of the signal from said second one-shot means, the second path causing the output of said photodetector means to be sent forth as the trigger signal only when a signal is derived from said second one-shot means.

4. A wireless slave electronic flash device located at a distance from a camera body for emitting light synchronized with a main flash of a master electronic flash unit built in or attached to the camera body, said master flash unit generating a plurality of pulse-like preliminary flashes of light separated by a time interval which is less than a first given time, prior to an exposure and a main flash of light separated from the last preliminary flash by a second time interval greater than said first time interval, during the exposure, said slave flash device comprising:

photodetector means for detecting a light emission of said master flash device and for outputting an electrical signal;

control means for outputting a light emission allowance signal by performing signal identification based on time intervals of an output signal train from said photodetector means derived from said preliminary flashes of light; and light emission means for causing a discharge tube to emit light when the light emission allowance signal and an output signal of said photodetector means are both present.

5. The device according to claim 4, wherein said control means includes:

first means for causing a signal state output time period thereof to extend in accordance with time intervals of an input signal train; and second means generating an output triggered by said first means, said second means output having a fixed signal output time period irrespective of time intervals of the input signal train.

6. A wireless slave electronic flash device located at a distance from a camera body and responsive to a light emission of a master electronic flash unit built in or connected to the camera body and for emitting light synchronized with a main light emission thereof, said master electronic flash generating a plurality of optical signals, spaced apart by a first time interval (t1), prior to said main light emission, said main light emission being an optical signal following a last one of said plurality of optical signals by a second time interval (t2) greater than said first time interval, said slave flash device comprising:

a discharge tube for emitting light;

a main capacitor accumulating electrical charge for enabling said discharge tube to emit light;

a trigger circuit adapted to initiate light emission of said discharge tube;

photodetection means for generating signals responsive to detecting said optical signals from said master flash unit; and a control circuit responsive to said photodetection means for activating said trigger circuit only when the main flash occurs during a third time interval which is initiated a fourth time interval after the occurrence of a last one of said plurality of optical pulses, the relationship of said first, second, third and fourth time intervals being t1<t4<t2<t3.

7. The device according to claim 6, wherein said control circuit includes:

a monostable multivibrator circuit being retriggerable in accordance with time intervals of an input signal and extendable in a signal output time period thereof.

8. A wireless slave electronic flash device located at a distance from a camera body and responsive to a light emission of a master electronic flash unit built in or connected to the camera body, for emitting light synchronized with a main flash of the master flash unit, said slave flash device comprising:

a discharge tube for emitting light;

a main capacitor for storing electrical charge for causing said discharge tube to emit light;

a trigger circuit for initiating light emission of said discharge tube;

photodetection means for detecting optical signals from said master electric flash unit; and a control circuit having first time measurement means for measuring a certain time, (i) for rendering said first time measurement means active when said photodetection means detects an optical signal, (ii) for, upon receipt of an optical signal comprising a main flash following the plurality of optical signals by a predetermined time period, causing said first time measurement means to be reset and then initiate a second time measurement, (iii) for preparing activation of said trigger circuit in response to generation of an output signal of said first time measurement means, and (iv) for activating said trigger circuit in synchronism with an optical signal representing said main flash.

9. The device according to claim 8, wherein said control circuit includes:

second time measurement means for initiating its own time measurement in response to the output of said first time measurement means, for generating an output signal during a predetermined time period, for terminating the preparation of activation of said trigger circuit at completion of the time measurement of said second time measurement means.

10. The device according to claim 8, wherein said first time measurement means is a retriggerable monostable multivibrator circuit.

11. The device according to claim 9, wherein said first time measurement means is a retriggerable monostable multivibrator circuit.

12. A wireless slave electronic flash device located at a distance from a camera body and responsive to light emission of a master electronic flash unit built in or connected to the camera body, for emitting light synchronized to a main flash of the master flash unit, said slave flash device comprising:

photodetector means for detecting light emission of said master flash unit;

first signal generator means for generating a first signal being variable in output level for a predetermined time period after detection of light emission of said master flash unit;

second signal generator means for generating a second signal being variable in output level for a predetermined time period in responsive to variations in the output level of said first signal generator means;

said first and second signals each having two output states; and control means for allowing light emission to be carried out in response to the first and second signals;

wherein said first signal generator means generates said first signal which is inverted for said predetermined time period after detection of light emission of said master flash unit, and wherein said second signal generator means generates said second signal which is output-inverted for said predetermined time period in response to a transition of the first signal in a predetermined direction.

13. The device according to claim 12, further comprising:

mode selector means for selectively switching between a first mode for providing light emission synchronized to a main flash after pre-emission of light is made by said master flash unit, and a second mode for providing light emission synchronized to a main single flash of light without associating any pre-emission of light.

14. The device according to claim 13, wherein said control means allows light emission in accordance with either the first signal only or both of the first and second signals, and wherein said mode selector means selects one of the operations, one of which forces light emission to be responsive only to the first signal, and the other of which allows light emission to be responsive to the first and second signals.

15. A wireless slave electronic flash device located at a distance from a camera body and responsive to a light emission of a master electronic flash unit built in or connected to the camera body, for emitting light synchronized with a main flash of the master flash unit, said device comprising:

preflash termination detector means for detecting termination of emission of preflashes produced at given intervals by said master flash unit and for generating a detection signal when a time interval between preflashes generated by the master flash unit is greater than said given time interval between preflashes; and control means for preparing light emission for a predetermined time period when the detection signal is generated.

16. A wireless slave electronic flash device located at a distance from a camera body and responsive to a light emission of a master electronic flash unit built in or connected to the camera body, for emitting light synchronized with a main flash of the master flash unit, said device comprising:

preflash termination detector means for detecting termination of emission of preflashes of said master flash unit and for generating a detection signal; and control means for preparing light emission for a predetermined time period when the detection signal is generated, wherein said preflash termination detector means determines termination of the preflashes by detecting that a light emission time interval of said master flash unit is greater than a predetermined time length.

17. The device according to claim 16, wherein a time period ranging from the termination of preflashes of said master flash unit to initiation of a main light flash thereof is longer than a reference time for detection of termination of said preflashes.

18. The device according to claim 17, wherein a time period for said control means to allow light emission is longer than a time period ranging between termination of preflashes of said master flash unit and initiation of the main flash thereof.

19. A wireless slave electronic flash device located at a distance from a camera body and responsive to a light emission of a master electronic flash unit built in or connected to the camera body, for emitting light synchronized with a main flash of the master flash unit, said device comprising:

preflash termination detector means for detecting termination of emission of preflashes of said master flash unit and for generating a detection signal; and control means for preparing light emission for a predetermined time period when the detection signal is generated, mode selector means for selectively switching between a first mode in which light emission is made in synchronism with a main flash of light after preflashes of said master flash unit, and a second mode in which light emission is performed in synchronism with a main single flash of light which occurs absent any preflashes of light.

20. A wireless slave electronic flash device located at a distance from a camera body and responsive to a light emission of a master electronic flash unit built in or connected to the camera body, for emitting light synchronized with a main flash of the master flash unit, said device comprising:

preflash termination detector means for detecting termination of emission of preflashes of said master flash unit and for generating a detection signal; and control means for preparing light emission for a predetermined time period when the detection signal is generated;

wherein said control means allows light emission to be performed in accordance with the first signal only or the first and second signals, and wherein said mode selector means selects one from operations, one of which forces light emission to be responsive only to the first signal, the other of which allows light emission to be responsive to the first and second signals.

21. A wireless slave electronic flash device located at a distance from a camera body and responsive to a light emission of a master electronic flash unit built in or connected to the camera body, for emitting light synchronized with a main light emission of the master electronic flash unit, the improvement wherein said slave electronic flash device is selectively set in one of a plurality of operation modes, one of which causes said slave flash device to emit light synchronized with a main single flash of said master flash unit, and another one of which, when said master flash unit performs a main flash of light after a plurality of intermittent preflashes of light are made, causes said slave flash device to emit light synchronized with said main flash.

22. A method for operating a wireless slave electronic flash device located a given distance from a camera body and responsive to light emission of a master electronic flash unit operated by the camera body, said slave device emitting light synchronized with a main flashlight emission of the master electronic flash unit, and having a light detector for detecting light from the master flash unit, said master flash unit operable in a first mode for generating a series of pre-flashes each spaced apart a first time interval followed by a main flashlight emission spaced a second time interval apart from a last one of the series of pre-flashes, said second interval being greater than said first interval, and operable in a second mode in which only a main flash emission is generated, said method comprising said steps of:

(a) generating, responsive to said first operating mode, a first timing pulse of a third time interval each time the light detector detects a pre-flash, said third time interval being greater than said first time interval and less than said second time interval;

(b) initiating a new first timing pulse of said third time interval each time the light detector detects a subsequent pre-flash which occurs prior to termination of said third time interval;

(c) generating a second timing pulse of a fourth time interval greater than said second time interval responsive to termination of a first timing pulse; and (d) triggering the slave flash when a main photographing flash of the master flash is detected during the time interval of said second timing pulse.

23. The method of claim 22 wherein, during said second operating mode, said slave flash is triggered responsive to detection of a photographing flash.

24. A method for operating a wireless slave electronic flash device located a given distance from a camera body and responsive to light emission of a master electronic flash unit operated by the camera body, said slave device emitting light synchronized with a main flashlight emission of the master electronic flash unit, and having a light detector for detecting light from the master flash unit, said master flash unit operable in a first mode for generating a series of preflashes each spaced apart a first time interval followed by a main flashlight emission spaced a second time interval apart from a last one of the series of preflashes, said second interval being greater than said first interval, said method comprising said steps of:

(a) generating, responsive to said first operating mode, a first timing pulse of a third time interval each time the light detector detects a preflash, said third time interval being greater than said first time interval and less than said second time interval;

(b) initiating a new first timing pulse of said third time interval each time the light detector detects a subsequent preflash which occurs prior to termination of said third time interval;

(c) generating a second timing pulse of a fourth time interval greater than said second time interval responsive to termination of a first timing pulse; and (d) triggering the slave flash when a main photographing flash of the master flash is detected during the time interval of said second timing pulse.

25. In combination, a master electric flash and a wireless slave electric flash device located at a distance from a camera body for emitting light synchronized with a main flash of said master electric flash unit built-in or attached to the camera body, said master electric flash generating pre-photographing light pulses at first time spaced intervals followed by a photographing light pulse spaced from a last pre-photographing light pulse by a second larger interval, said slave flash device utilizing a circuit for totally eliminating a need for a microcomputer or the like, said circuit comprising:

photodetection circuit means for detecting a light emission of the master flash unit and for outputting an electrical signal;

a resettable circuit having a normal first output state and being changed to a second output state upon receipt of an output of said photodetection circuit means, said resettable circuit being reset to set first state when a time interval between signals generated by said pre-photographing light pulse is greater than a first time interval and being maintained in said second state when a time interval between signals generated by said pre-photographing light pulses is less than a reset time of said resettable circuit; and light emission initiation signal output means for outputting a signal for initiating emission of light by said slave device in response to receipt of the output signal of said resettable circuit in response to receipt of the second output state of said resettable circuit and said photographing light pulse;

said master flash unit generating at least three pre-photographing light pulses followed by said photographing light pulse.

26. The combination of claim 25 further comprising a second resettable circuit responsive to the reset output of said first-mentioned resettable circuit for generating an enable condition for a given time interval, said light emission signal output means generating said signal for emitting flash only when said photographing light pulse occurs during the time interval that said enable condition is present.

* * * * *